United States Patent
Chrobaczek et al.

(10) Patent No.: US 6,803,407 B2
(45) Date of Patent: Oct. 12, 2004

(54) POLYORGANOSILOXANES HAVING ALKOXYLATED SIDE CHAINS

(75) Inventors: Harald Chrobaczek, Augsburg (DE); Franz Dirschl, Augsburg (DE); Ralf Goretzki, Stadtbergen (DE); Günther Tschida, Schwabmünchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 49 days.

(21) Appl. No.: 10/221,614

(22) PCT Filed: Mar. 13, 2001

(86) PCT No.: PCT/EP01/02768
§ 371 (c)(1),
(2), (4) Date: Sep. 13, 2002

(87) PCT Pub. No.: WO01/68773
PCT Pub. Date: Sep. 20, 2001

(65) Prior Publication Data
US 2003/0026915 A1 Feb. 6, 2003

(30) Foreign Application Priority Data
Mar. 16, 2000 (DE) ........................................ 100 12 913

(51) Int. Cl.$^7$ .............................................. C08L 83/10
(52) U.S. Cl. ........................... 524/588; 528/31; 528/25; 556/445; 568/673; 8/128.3
(58) Field of Search ..................... 528/31, 25; 556/445; 568/673; 524/588; 8/128.3

(56) References Cited

U.S. PATENT DOCUMENTS

| | | | |
|---|---|---|---|
| 4,018,723 A | 4/1977 | Kanner et al. | 260/2.5 |
| 4,561,987 A | 12/1985 | Yamamoto et al. | 252/8.9 |
| 4,898,981 A | 2/1990 | Falk et al. | 568/28 |
| 5,057,572 A | 10/1991 | Chrobaczek et al. | 524/588 |
| 5,130,344 A | 7/1992 | Kollmeier et al. | 521/111 |
| 5,214,121 A | 5/1993 | Mosch et al. | 528/49 |
| 5,254,134 A | 10/1993 | Zhao et al. | 8/120 |
| 5,310,783 A | 5/1994 | Bernheim et al. | 524/837 |
| 5,430,097 A * | 7/1995 | Petroff et al. | |
| 5,540,952 A | 7/1996 | Canivenc et al. | 427/387 |
| 5,612,409 A | 3/1997 | Chrobaczek et al. | 524/838 |
| 5,688,889 A | 11/1997 | Canivenc et al. | 528/40 |
| 5,834,613 A | 11/1998 | Jost et al. | 554/437 |
| 6,184,329 B1 | 2/2001 | Jost et al. | 528/15 |
| 6,197,987 B1 | 3/2001 | Jost et al. | 556/410 |

FOREIGN PATENT DOCUMENTS

| | | |
|---|---|---|
| EP | 0367281 | 5/1990 |
| EP | 0671500 | 9/1995 |
| GB | 2082215 | 3/1982 |
| WO | 99/47111 | 9/1999 |

OTHER PUBLICATIONS

Ullmanns Encyklopädie der technischen Chemie, 4$^{th}$ Ed., vol. 23, (1983), p. 82/83.

* cited by examiner

*Primary Examiner*—Kuo-Liang Peng
(74) *Attorney, Agent, or Firm*—Kevin T. Mansfield

(57) ABSTRACT

Described are polysiloxane compositions that are obtainable in 2 steps. The first step comprises reacting a linear organopolysiloxane which contains Si—H bonds with a compound that has a terminal C=C double bond and a polyoxyalkylene chain. This reaction is carried out in such a way that Si—H bonds are still present in the resultant product. The second step comprises adding a base or water and an acid to the resultant product. The hydrophilic properties of the resultant polysiloxane compositions can be influenced in a specific manner. The compositions are useful for treating fiber materials, especially textile fabrics. The effects obtained are notable for good durability. Further groups may be incorporated into the polysiloxanes to open up further applications.

15 Claims, No Drawings

POLYORGANOSILOXANES HAVING ALKOXYLATED SIDE CHAINS

This invention relates to specific organopolysiloxane compositions and to their use for treating fiber materials, especially textile fabrics in the form of wovens, knits or nonwovens.

It is known to treat textile fabrics with compositions which include polysiloxanes to control textile water repellency, hydrophilicity and hand, depending on the choice of polysiloxane. The compositions usually used for this purpose are aqueous solutions or dispersions which include the desired polysiloxanes. A particularly soft hand is obtainable when the organopolysiloxanes have side chains that contain amino groups.

Textile fabrics have also been treated using organopolysiloxanes which contain polyoxyethylene groups with or without polyoxypropylene groups. Such polysiloxanes and their use are described in EP 578 144 A2, DE-A 26 07 469, DE-B 39 28 867, EP 494 683 A1 and WO 99/47111.

Textile fabrics have also been treated using polysiloxanes having Si—OH bonds, for example α,ω-dihydroxypolydimethylsiloxanes, also polysiloxanes containing Si—H bonds, for example polyalkylhydrosiloxanes as described in Ullmanns Encyklopädie der technischen Chemie, 4th edition, Volume 23, 1983, page 82/83, Verlag Chemie, Weinheim, Germany. The use of hydropolysiloxanes is also disclosed in GB-A 2 082 215. Polysiloxanes containing Si—H bonds and their use are also described in EP-A 755 960 and EP-A 755 961.

Although prior art silicone textile finishes have some advantages, they are not in every respect optimal. For instance, in many cases it is not possible to control the hydrophilic properties of the finished fiber materials with these known polysiloxanes in a specific manner. Another problem is the frequently inadequate durability of the effects, especially after the textile has been washed.

It is an object of the present invention to provide polysiloxane compositions which confer a pleasantly soft hand on fiber materials treated therewith and which also make it possible to influence the hydrophilic/hydrophobic properties of fiber materials in a specific manner and which lead to excellent durability for the effects mentioned.

This object is achieved by a polysiloxane composition preparable by reacting a linear organopolysiloxane whose chain ends are formed by $R_3SiO$— units and which has on average two or more —$Si(R)(H)$—O— units in the chain with a compound of the formula (I)

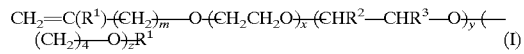

$$CH_2\!\!=\!\!C(R^1)\text{–}(CH_2)_m\text{–}O\text{–}(CH_2CH_2O)_x\text{–}(CHR^2\text{–}CHR^3\text{–}O)_y\text{–}(CH_2)_4\text{–}O\text{–}_zR^1 \quad (I)$$

where the individual —$CH_2CH_2O$—, —$CHR^2$—$CHR^3$—O— and $(CH_2)_4$—O units may be distributed in the chain of the compound of the formula (I) in any desired pattern, this reaction being carried out in such a way that the resultant product still contains Si—H bonds and the resultant product is admixed with water or a protic acid or a base, the base being an amino-functional organopolysiloxane or a mixture of an alcohol of 5 to 50 carbon atoms and an alkali metal alkoxide or a mixture of water and a strong inorganic base, wherein every R is independently phenyl or alkyl of 1 to 4 carbon atoms, $R^1$ is H or R, one of $R^2$ and $R^3$ is H and the other is $CH_3$ and wherein m is from 1 to 8, preferably 1,
x is from 2 to 40,
y is from 0 to 10, and
z is from 0 to 10.

The compositions of the invention are very useful for treating fiber materials, especially textile and fabrics in the form of wovens, knits or nonwovens. For this they are preferably used in the form of aqueous dispersions or solutions and can be applied to these fabrics in the course of the textile finishing process, for example after a dyeing step, using known methods, for example by padding. The fabrics can be composed of a variety of materials such as wool, cotton, regenerated cellulose or synthetics such as polyester or polyamide. Similarly, textile fabrics composed of blends of fibers, for example fibers of the type mentioned, can be treated with compositions according to the invention. The finishing liquors here may include further customary textile finishing additives, for example flame retardants or cellulose crosslinkers.

By choosing compositions according to the invention in a specific manner, the hydrophilic/hydrophobic properties of the fiber materials treated can be influenced in a specific manner. For instance, raising the degree of ethoxylation (=raising the value of x in the compounds of formula (I)) imparts enhanced hydrophilicity to the fiber materials. When x, y and z in formula (I) have suitable values it is possible to obtain compounds according to the invention that are self-dispersing or soluble in water without use of dispersants. Compounds according to the invention may frequently even function efficiently as dispersants for dispersing other products in water or in oil, ie. for preparing O/W or W/O emulsions, including for cosmetic purposes. Compounds according to the invention confer on textile fabrics, for example garments, a pleasant, very soft hand even without the presence of amino groups or without the additional use of soft-hand agents. If desired, however, soft-hand agents of the type customary in the textile finishing industry may be used in addition.

The effects provided by compositions according to the invention possess good durability, even after the textiles have been washed. A possible explanation is that the compositions contain Si—H bonds or Si—OH bonds and so are crosslinkable with themselves or with the fiber material, for example in the case of the use of a customary cellulose crosslinker, or else that a crosslinking reaction has taken place even before the application to the fiber material, for example because an amino-functional polysiloxane has been used as a base in the synthesis. These matters will be discussed hereinbelow.

Compounds according to the invention are obtainable by first reacting a linear organopolysiloxane of the hereinbelow described type with a compound of the formula (I) and subsequently adding water and acid or a base of the hereinbelow designated type. The organopolysiloxane used for the reaction mentioned is linear, ie. all the silicon atoms it contains are situated in a single polymer chain. This chain preferably contains 10 to 500 silicon atoms. The ends of this chain are formed by $R_3Si$—O— units. Every R is independently a phenyl radical or a linear or branched alkyl radical of 1 to 4 carbon atoms. Preferably R is methyl. This applies not only to the chain ends, but also to the other R-containing groups in the polysiloxanes used. Similarly, in the compounds of the formula (I) R is preferably $CH_3$ when $R^1$=R.

The polysiloxane chain in the linear organopolysiloxanes used as a starting compound shall contain at least two —$Si(R)(H)$—O— units on average. It may also contain more such units. These units contain an Si—H bond as well as an Si—R bond. This Si—H bond is reactive and capable of crosslinking, condensation and addition reactions. When the polysiloxanes are reacted with compounds of the formula (I), an Si—H unit is added to the C=C double bond of a compound of the formula (I).

The statement made above and in claim 1, that the organopolysiloxane used shall on average contain two or more —Si(R)(H)—O— units, means the following: polymer syntheses will for known reasons virtually always give rise to mixtures of products that differ in chain length among other respects. It is therefore possible that some molecules of the organopolysiloxanes which can be used for preparing compositions according to the invention contain only one or no unit of the formula —Si(R)(H)—O—. However, the majority of the molecules shall contain at least two such units and on average the organopolysiloxane used shall contain two or more such units, ie. the total number of such units present has to be at least 2 n, where n is the number of molecules of the organopolysiloxane. Preferably, 20 to 100% of the silicon atoms in the organopolysiloxane used for the reaction, except for the two silicon atoms at the chain ends, each have a hydrogen atom attached to them.

As well as the —Si(R)(H)—O— units mentioned, the organopolysiloxane chain may contain further units; in a preferred embodiment it additionally contains —Si(R$_2$)O— units, where R is as defined above and in claim 1. In a further preferred embodiment, units of the formula —Si(R)(R$^4$)—O— are still present in the chain. Here R is as defined above and R$^4$ is linear or branched alkyl of 5 to 25 carbon atoms. The polysiloxane chain may also contain a plurality of such units which differ in the chain length of the R$^4$ radical. The presence of longer-chained alkyl R$^4$ radicals may be responsible for even further softening of the hand of the finished fiber materials.

The reaction with a compound of formula (I) may be carried out not only with a single organopolysiloxane but also with a mixture of organopolysiloxanes which meet the abovementioned conditions. Similarly, instead of a single compound of the formula (I) being used it is also possible to use a mixture of such compounds, for example a mixture which includes two compounds of formula (I) of which one contains —CHR$^2$—CHR$^3$—O— and/or (CH$_2$)$_4$—O— units (y and/or z>0) and the other doesn't (y=0, z=0). Mixtures whose individual products differ in the value of x are also useful.

Organopolysiloxanes useful as starting materials for the reaction with compounds of the formula (I) are commercially available, for example products from Wacker Chemie GmbH, Germany.

Compounds of the formula (I) are ethoxylated or ethoxylated/propoxylated alcohols which may additionally contain (CH$_2$)$_4$—O— butoxy groups. The R$^1$ radical present on the second carbon atom of the C=C double bond is hydrogen or an R radical of the type described above. This R$^1$ is preferably hydrogen. When R$^1$ is R, it is preferably a methyl group. The other R$^1$ radical present in the formula (I), namely the R$^1$ radical at the end of the polyoxyethylene or polyoxyethylene/polyoxypropylene/polyoxybutylene chain is likewise hydrogen or an R radical. This R$^1$ radical is preferably methyl.

In the formula (I) m is from 1 to 8, preferably 1. In the latter case, the compounds of the formula (I) are preferably alkoxylated (meth)allyl alcohols. They are preparable by ethoxylation and/or ethoxylation/propoxylation with or without butoxylation of (meth)allyl alcohol in a conventional manner and optionally subsequent etherification of the terminal OH group. When it is not just an ethoxylation but also a propoxylation (y>0) which is being carried out, the ethoxylation and propoxylation may be carried out simultaneously or in succession. The former gives rise to random copolymers, the latter to block copolymers. Consequently, in the formula (I) the individual —CH$_2$CH$_2$—O—, CHR$^2$—CHR$^3$—O— and (CH$_2$)$_4$—O— units need not be arranged precisely as expressed by formula (I), but may be distributed in the chain in any pattern. In the formula (I) one of R$^2$ and R$^3$ is hydrogen and the other is methyl. The units of the formula CHR$^2$—CHR$^3$—O— are formed in a known manner by reaction of a terminal OH group with propylene oxide. The introduction of butoxy groups (CH$_2$)$_4$—O— is effected in a known manner by reacting the allyl alcohols or the previously ethoxylated or ethoxylate/propoxylated allyl alcohols with tetrahydrofuran in the presence of ethylene oxide and/or propylene oxide and by using an acidic catalyst.

In the formula (I), x is from 2 to 40, preferably from 5 to 30, y is from 0 to 10, preferably from 0 to 8, and z is from 0 to 10, preferably from 0 to 8. Preference is given to using compounds of the formula (I) where x is not less than the sum total of y and z. The values of x, y and z are specifically controllable in a known manner by means of the quantitative ratios used for the alkoxylation. Since alkoxylations normally give rise to mixtures of compounds of different values of x and/or y and/or z, compositions according to the invention are customarily prepared using such mixtures of compounds of the formula (I).

Useful compounds of the formula (I) are obtainable on the market, for example Pluriol A 010 R (BASF AG, Germany).

The reaction of organopolysiloxane with a compound of the formula (I) is customarily carried out at a temperature in the range from 40 to 130° C., preferably 80–110° C., and can be carried out without use of a solvent. A catalyst or a mixture of catalysts can be used for this reaction. Useful catalysts include metal compounds, especially salts or complexes of rhodium, of palladium or of platinum such as H$_2$PtCl$_6$ or 1,3-divinyl-1,1,3,3-tetramethyldisiloxaneplatinum(0) complex (this complex is obtainable in the form of a concentrate from Degussa-Hüls, Germany). Preferably the organopolysiloxane and a portion of the compound of the formula (I) are initially charged and the rest of the compound of the formula (I) and the catalyst are gradually added to this initial charge.

The reaction of the organopolysiloxane with a compound of the formula (I) has to be carried out in such a way that the resultant product still contains Si—H bonds. These are capable of further reactions, for example for a subsequent reaction with water and acid or with base. In order that the resultant product may still contain Si—H groups, the reaction is carried out using a deficiency of C=C double bonds compared to the Si—H bonds present. However, in certain circumstances, for example when the reaction does not go to completion for steric reasons, the resultant product will still have Si—H bonds when the amounts of C=C used are equivalent to the amounts of Si—H used. Before equivalent quantities are used, however, a preliminary test should be carried out to examine whether the reaction product still contains Si—H bonds. In the event that the reaction does not go to completion, for example for steric reasons, the resultant product will still include fractions of compound of the formula (I). These may interfere with the further reaction with acid or base or with the use of the compositions according to the invention. In such a case, they have to be removed beforehand. In the event of a sterically hindered reaction, it can be advisable to use equivalent amounts of C=C double bonds, based on Si—H bonds, in order that the desired number of alkoxylates be incorporated into the polysiloxane. Where an excess level of compounds of formula (I) is not troublesome in the products obtained after the reaction of the organosiloxane with a compound of formula (I), it can be advantageous to carry out the reaction with an excess of C═C double bonds of the compound of formula (I) compared to Si—H bonds of the organopolysiloxane, under the precondition, of course, that not all the Si—H bonds of the siloxane are converted. With this procedure, the compositions according to the invention will still include fractions of unconverted compounds of the formula (I) and they are particularly useful as emulsifiers. Another way of preparing such emulsifiers is to prepare compounds according to the invention without excess of compound of the formula (I) and subsequently to add once more certain amounts of compounds of the formula (I). In a preferred embodiment, the reaction is carried out with such amounts of organopolysiloxane that a total of 0.7 to 1.0 C═C double bonds in the compound of the formula (I) are used per Si—H bond. When the organopolysiloxane is additionally reacted with a compound of the formula (II) before, during or after the reaction of the compound of the formula (I), the same statement applies mutatis mutandis. In this case the stated 0.7 to 1.0 C═C double bonds is based on the sum total of the C═C double bonds present in the compound of the formula (I) and of the formula (II).

After the reaction of the organopolysiloxane with the compound of the formula (I), the resultant product is mixed with a base or water or a protic acid, preferably a strong acid. When water and a protic acid are used, the Si—H bonds still present in this product will react to form Si—OH bonds. Protic acids here are Brönsted acids, which are either used as such or released from Lewis acids in the presence of water. The resultant Si—OH bonds are capable of further reactions, for example crosslinking with textile fiber material. An example of this is crosslinking by reaction with OH groups of cellulose material. Similarly, crosslinking with reaction groups generated by a preceding plasma treatment of the textile material is a possibility. Such a plasma treatment can be effected according to known methods, one of these methods being a pretreatment of the textile material with oxygen plasma under reduced pressure. Fiber materials useful for such a plasma treatment include cellulose, regenerated cellulose, wool and polyamide.

The Si—OH bonds formed are accessible not only to the crosslinking reactions mentioned but also to condensation reactions, for example with silanes and polysiloxanes. This is described hereinbelow.

To add water and an acid, preferably a strong acid, to the product which has formed after the reaction of the organopolysiloxane with the compound of the formula (I), it is preferable to pour this product into water and then to slowly add an aqueous solution of the acid. The resulting exothermic reaction, which releases hydrogen, should be controlled by monitoring the temperature in the reaction vessel. Useful acids include strong mineral acids such as sulfuric acid, hydrochloric acid, phosphoric acid or acetic acid or formic acid. It is advantageous for the mixture of water and acid and reaction product to have a pH in the range from 0.5 to 4.5. After the reaction of the Si—H bonds and before use of the inventive composition for textile treatment, the acid should be at least partially neutralized in order that damage to the textile fiber material may be avoided.

Instead of water and acid, a base may also be added to the reaction product of organopolysiloxane and the compound of the formula (I). The use of base is preferable to the use of acid. This base can be amino-functional organopolysiloxane, a mixture of water and strong inorganic base or a mixture of alcohol of 5 to 40 carbon atoms and an alkali metal alkoxide. The base may be added at room temperature or at slightly elevated temperature. When an amino-functional organopolysiloxane is used, it is believed that the amino groups of this polysiloxane will react with the Si—H bonds of the reaction product by evolving hydrogen and forming Si—N bonds. The products thus formed already have a certain degree of crosslinking, which provides good durability for the effects after application to fiber materials. By using a deficiency of amino groups in the amino-functional polysiloxane the resultant product will still contain Si—H bonds capable of crosslinking with reactive groups of the fiber material, especially at elevated temperatures.

Useful amino-functional polysiloxanes include for example polydimethylsiloxanes in which one or more non-terminal methyl groups are each replaced by a radical containing one or more amino groups. Such products are commercially available, for example from Dow Corning or Wacker GmbH. They are preparable by a known equilibration of linear or cyclic siloxanes in the presence of silanes which contain two alkoxy radicals and one amino-functional radical attached to silicon. Similarly, radicals having sterically hindered amino-functional radicals are suitable, as described for example in EP-A 659 930. Further suitable amino-functional polysiloxanes are disclosed in U.S. Pat. No. 5,310,783.

In place of amino-functional polysiloxane, a mixture of an alcohol of 5 to 50 carbon atoms and an alkali metal alkoxide may be used as base. The alkali metal alkoxide, which serves as a catalyst, is preferably sodium methoxide, potassium methoxide, sodium ethoxide or potassium ethoxide. As described above for the case of the addition of water and acid, the procedure employed is preferably similar in that the resultant reaction product is combined with a portion of the alcohol and then, while monitoring the temperature, the rest of the alcohol and the alkoxide are gradually added. As the alcohol and alkoxide are added to the product of the reaction mentioned, the Si—H bonds are converted into Si—O—C bonds. The amount of alkoxide can be in the customary range known for catalysts. It should be determined in such a way that the pH of the mixture is in the range from about 7.5 to 10.5. The amount of alcohol added is advantageously determined in such a way that the number of OH groups of the alcohol which react with Si—H is approximately equivalent to the number of Si—H bonds, so that essentially all the Si—H bonds are converted into Si—O—C bonds. The alcohol used contains 5 to 50 carbon atoms. It can be monohydric or polyhydric alcohol wherein the individual hydroxyl groups are attached to a linear or branched monovalent or polyvalent hydrocarbyl radical. A portion of the hydrogen atoms of this hydrocarbyl radical may be substituted by fluorine atoms. Useful alcohols include for example alcohols whose hydrocarbyl radicals are perfluoroalkyl groups. A useful polyhydric alcohol is

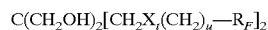

where X is —O— or —S—, $R_F$ is a perfluoroalkyl radical of 2 to 20 carbon atoms, t is 0 or 1 and u is from 1 to 4. Such alcohols are described in U.S. Pat. No. 5,214,121 and U.S. Pat. No. 4,898,981. It is also possible to use alcohols of the formulae

where $R_F$ is as defined above, w1 is from 0 to 10 and w2 is from 4 to 20, or alcohols of these formulae wherein one or more hydrogen atoms of the —CH$_2$— groups are replaced by OH. The base added after the reaction of the organopolysiloxane with a compound of the formula (I) may also be a mixture of water and a strong inorganic base. The use of such a mixture is preferable to the use of another base and to the use of water and acid. Preferred strong inorganic bases are sodium hydroxide or potassium hydroxide. Similarly to the method described above, preferably at first only a portion of the desired amount of water is added to the reaction product. Subsequently the rest of the water and the strong inorganic base are then added, advantageously in the form of an aqueous solution of this base. The addition of the strong inorganic base should take place while monitoring the temperature of the reaction mixture, since the ensuing reaction is exothermic and evolves $H_2$. This reaction converts the Si—H bonds of the reaction product used into Si—OH bonds. These are capable of further reactions, for example crosslinking with reactive groups of the textile fiber material at elevated temperature. Such crosslinking, for example with OH groups on cellulose materials, provides excellent durability for the effects provided by the compositions according to the invention. Another way in which the Si—OH groups formed may further react is in crosslinking or condensation reactions even before application to fiber materials. This is described hereinbelow.

Like the alkoxide in the case of the aforementioned use of a mixture of alcohol and alkoxide, the strong inorganic base which is used in the mixture with water performs the function of a catalyst. The amounts of strong inorganic base used can accordingly be in the range customary for catalysts. Preferably the reaction mixture has a pH of about 7.5 to 10.5 after addition of water and strong inorganic base. As in the case of the addition of acid it can be advisable to neutralize the mixture again after the Si—H bonds have been converted. The amount of water used in the case of the use of a mixture of water and a strong inorganic base is preferably at least such that substantially all Si—H bonds are converted into Si—OH bonds. In some cases more water can be used, for example when the resultant compositions according to the invention are subsequently to be converted directly into aqueous dispersions of these compositions. In other cases, in contrast, a large excess of water is to be avoided, for example when an equilibration or condensation reaction is to be carried out subsequently, as described hereinbelow, only just enough water or slightly more should be used as is needed to convert the Si—H bonds into Si—OH bonds and to hydrolyze the Si—OR groups of the aminodialkoxyalkylsilane.

In addition to using a mixture of an alcohol containing perfluoroalkyl groups and alkoxide as a base there are other ways to integrate perfluorinated $R_F$ radicals into compositions according to the invention. The compositions obtained as a result are frequently useful for purposes for which compositions according to the invention that contain no fluorine are less appropriate. A possible use for inventive compositions containing perfluoroalkyl radicals is in firefighting, for example by applying such a composition to burning carpets of oil. It is advantageous for this purpose to use such compositions as possess an enhanced hydrophilicity owing to their high level of $CH_2CH_2O$— units and as may be useful as dispersants for interfacial boundaries. When such applications are contemplated, there is a preferred embodiment of compositions according to the invention wherein the organopolysiloxane used is reacted with a compound of the formula (II) before or simultaneously with the reaction with the compound of the formula (I), or, after the reaction of the organopolysiloxane with the compound of formula (I), the resultant product is reacted with a compound of formula (II) prior to addition of water and acid or base, this reaction with a compound of formula (II) being carried out in such a way that the resultant product still contains Si—H bonds,

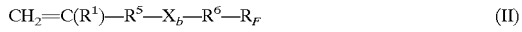   (II)

where $R_F$ is a linear or branched perfluoroalkyl radical of 2 to 20 carbon atoms, X is —O—, —S—, —S—S—, —$NR^1$—$SO_2$—, —$NR^1$—, —NH—CO—O—, —NH—CO—NH—, O—CO— or —CO—O—, $R^6$ is —$(CH_2)_a$—, where a is from 0 to 10, $R^5$ is $R^6$ or an $R^6$ radical where a is from 1 to 10 and in which a hydrogen atom is replaced by —$X_b$—$R^6$—$R_F$ or by —COOH, b is 0 or 1, and $R^1$ is as defined in claim 1.

In similar fashion to their reaction with the C=C double bonds of the formula (I), Si—H bonds of the organopolysiloxane may also add to C=C double bonds of the formula (II) to provide organopolysiloxanes containing $R_F$ perfluoroalkyl radicals. The reaction can be carried out by reacting the organopolysiloxane with a compound of the formula (II) before or simultaneously with the reaction with a compound of the formula (I). In both cases care must be taken to ensure to use only such amounts of compound of the formula (II) that there are still Si—H bonds in the organopolysiloxane which are capable of reacting with the compound of the formula (I). It is preferable to use a compound or a mixture of compounds of the formula (II) in such amounts that 0 to 0.6 C=C double bonds of the formula (II) are used per C=C double bond of the formula (I). In place of a single compound of the formula (II) it is also possible to use a mixture of such compounds. The reaction with a compound of the formula (II) can also take place after the reaction of the organopolysiloxane with a compound of the formula (I), but before the addition of base or of water and acid. The reaction with a compound of the formula (II), like the reaction with a compound of the formula (I), can be carried out in the presence of a catalyst. Useful catalysts include the same metal-containing catalysts as described for the reaction with a compound of the formula (I). Regardless of the time at which the reaction with a compound of the formula (II) is carried out, care must be taken to ensure that the resultant product still contains Si—H bonds before base or water and acid are added. This is controllable through choice of suitable quantitative ratios.

In the formula (II) $R_F$ is a perfluoroalkyl radical which may be linear or branched and contains 2 to 20 carbon atoms. This radical is preferably unbranched. The $R_1$ radical is as defined above and in claim 1 and preferably is hydrogen or methyl. The divalent X radical is oxygen, sulfur, a disulfide linkage, —$NR^1$—, —$NR^1$—$SO_2$—, —NH—CO—O—, —NH—CO—NH—, —O—CO— or —CO—O—. $R^1$ here is again as defined above. When X is —$NR^1$—$SO_2$— or —NH—CO—O—, this radical is attached to the divalent $R^6$ radical either via the nitrogen atom or via an oxygen atom. In the formula (II) b is 0 or 1. $R^6$ is —$(CH_2)_a$—, where a is from 0 to 10. The divalent $R^5$ radical is either —$(CH_2)_a$—, where a is again from 0 to 10, or a radical that differs from the $R^6$ radical in that a is from 1 to 10 and a hydrogen atom in the unit —$(CH_2)_a$— is replaced by a radical of the formula —$X_b$—$R^6$—$R_F$ or by —COOH. Here X, b, $R^6$ and $R_F$ are each as defined above.

Compounds of the formula (II) are commercially available or preparable by methods known to the chemist.

After, as described, a base or water and acid has been added to the reaction mixture, polysiloxane compositions according to the invention are present. These are useful for treating fiber materials in the form of textile fabrics. For this purpose they are preferably converted into aqueous dispersions as described hereinbelow. These dispersions may have added to them further components of the type known for textile finishing, for example flame retardants and cellulose crosslinkers.

Instead of being directly used for the treatment of fiber materials, compositions according to the invention may be subjected to further chemical modifications prior to this use. An example of a further chemical modification is the known equilibration of polysiloxanes by reacting a polysiloxane in the presence of an alkaline catalyst with a silane in which at least two —OR radicals are attached to the silicon atom. The other two radicals attached to silicon are substantially freely choosable. In this equilibration, which is preferably carried out at a temperature in the range from 110 to 130° C., the chain of the polysiloxane is fragmented, the silane unit is incorporated and the chain is reformed. Catalysts useful for this purpose include NaOH or KOH. This equilibration may be accompanied by a similarly known condensation reaction to chain extend the polysiloxane. To this end, the polysiloxane is reacted in the presence of a catalyst not just with silane but with a mixture which includes silane and either a linear α,ω-dihydroxypolyorganosiloxane or a cyclic oligodialkylsiloxane. There is accordingly a preferred embodiment of compositions according to the invention wherein the product obtained after the addition of base or of water and acid is reacted with an aminodialkoxyalkylsilane or with a mixture which includes such a silane and either a linear α,ω-dihydroxypolyorganosiloxane or a cyclic oligodialkylsiloxane. This reaction, which involves at least one aminodialkoxyalkylsilane, has to be carried out in the presence of water. Useful linear dihydroxypolyorganosiloxanes have an OH group at each chain end and may be widely varied in the chain length, for example between 5 and 1000 silicon atoms. Useful cyclic oligodialkylsiloxanes include in particular hexamethylcyclotrisiloxane or octamethylcyclotetrasiloxane. The equilibration/condensation reaction may also be carried out using a mixture which, as well as silane, includes not just one of the two compounds mentioned here, but both together.

The preferred silane for the equilibration or condensation is an aminodialkoxyalkylsilane of the following structure:

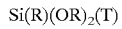

where R is as defined above and in claim 1 and all R radicals are each preferably independently methyl or ethyl. The T radical is a monovalent radical that contains one or more amino groups. Preferably it contains at least one primary amino group. Useful T radicals are disclosed in U.S. Pat. No. 5,612,409, where they are referred to as "radicals Z".

This equilibration reaction provides compositions according to the invention that comprise polysiloxanes containing one or more T radicals and hence amino groups.

When using compositions according to the invention to treat fiber materials, they are preferably used in the form of aqueous solutions or aqueous dispersions. Accordingly, in a preferred embodiment of the compositions, the addition of base or of water and acid is followed by the addition of water and optionally also a dispersant or dispersant mixture in such an amount that an aqueous polysiloxane dispersion is formed. A possible procedure in this case is to follow the reaction of the organopolysiloxane with the compound of the formula (I) by adding water and an acid or an aqueous solution of an inorganic base in such amounts that an aqueous dispersion is formed. This may necessitate a homogenizing step and/or the use of one or more dispersants. The aqueous dispersion may also be prepared by stirring the product obtained after addition of acid or base into water with or without homogenization and use of a dispersant. When, as described above, a reaction with a compound of the formula (II) or an equilibration or condensation using an aminodialkoxyalkylsilane is carried out, the aqueous dispersion is preferably not prepared until after these reaction steps.

When compositions according to the invention are not water soluble or self-dispersing, one or more dispersants are used to prepare aqueous dispersions. Useful dispersants for this purpose include dispersants known to one skilled in the art of silicone emulsions, for example ethoxylated fatty alcohols. When compositions according to the invention contain perfluoroalkyl groups, cationic dispersants such as quaternized ammonium salts will frequently provide good results.

Depending on the ingredients of compositions according to the invention, these are also obtainable in the form of particularly stable microemulsions. A suitable process for preparing microemulsions is described in U.S. Pat. No. 5,057,572 for the case of amino-functional polysiloxanes. Polysiloxane microemulsions can be used for petroleum production as well as textile finishing.

The most important use of compositions according to the invention is to use them in the form of aqueous dispersions for treating fiber materials. Useful fiber materials include textile fabrics in particular. The compositions may be applied to these fabrics in a conventional manner, for example using a pad-mangle. The liquor concentrations used here may lie in the customary range, in which case the liquors may include further known textile finishing components. After padding, the textile is dried in a known manner and if necessary cured at elevated temperature. A cure, for example at 140–180° C., shall be carried out in particular when crosslinking is desired for the composition of the invention with itself or with the fiber material.

The examples which follow illustrate the invention.

EXAMPLE 1 (INVENTIVE)

15 g of a commercially available alkylhydropolysiloxane which contains about 40 silicon atoms, has $(CH_3)_3Si$ radicals at both chain ends and contains —$Si(CH_3)(H)$—O— units in the chain were reacted with 95 g of an ethoxylated allyl alcohol (about 7—$CH_2CH_2$—O— units) whose chain end was formed by O-alkyl. The reaction, featuring approximately equivalent amounts of C=C double bonds and Si—H bonds, was carried out at about 100° C.–110° C. and in the presence of 18 ppm of platinum in the form of $H_2PtCl_6$ as catalyst. The viscosity increased markedly during the reaction, which had ended after about 4 hours, providing a yellowish clear product having a viscosity of about 10 000 mpas.

50 g of a product prepared as above were stirred into 150 g of water at room temperature. 0.3 g of 45% aqueous KOH was added with stirring. The mixture had a pH of about 9.5 and was stirred at room temperature for about 90 minutes and then adjusted to about pH 5 with acetic acid to provide a slightly yellowish clear product possessing excellent utility for treating textile fabrics.

EXAMPLE 2

15 g of the alkylhydropolysiloxane described in Example 1 were initially charged together with 3 g of 1-octadecene. A mixture of 90 g of an ethoxylated allyl alcohol (about 7—$CH_2$—$CH_2$—O— units) whose chain end was formed by —O-alkyl and 18 ppm of platinum in the form of $H_2PtCl_6$ were added a little at a time under nitrogen. The exothermic reaction caused the temperature to rise to 110° C. This was followed by a supplementary reaction at 110° C. for 3.5 h to provide a yellowish clear product having a viscosity of about 800 mpas.

50 g of a product prepared as above were stirred into 150 g of water at room temperature, adjusted to pH 9–10 with 45% aqueous KOH and stirred at room temperture for 90 minutes. The pH was then adjusted to about 5 with acetic acid.

EXAMPLE (COMPARATIVE)

50 g of a linear organopolysiloxane which contained about 35 silicon atoms, whose chain ends were formed by $(CH_3)_3Si$ radicals and which contained approximately equal amounts of —$Si(CH_3)_2$—O— units and —$Si(CH_3)$=[$CH_2CH_2CH_2$—O—$(EO)_6$—H]—O— units in the chain but in contradistinction to products of the invention had no —$Si(CH_3)(OH)$—O— and no Si—H or other functional units were stirred into 150 g of water at room temperature to provide a colorless clear, liquid product.

EO represents ($CH_2CH_2$—O)

Application Testing

Products obtained as per Example 1, Example 2 and the Comparative Example were used to prepare aqueous liquors having a customary concentration of 30 g/l. To test the hand performance, cotton batiste fabrics were padded with this liquor, while cotton-polyester knit was used for the hydrophilicity test. The padded fabrics were dried at 110° C. for 10 minutes.

|  | Hydrophilicity Wetting time in [s] | Soft hand * |
|---|---|---|
| Example 1 | 0 | 2 |
| Example 2 | 0 | 1 |
| Comparative Example | 0 | 3 |

* 1 denotes best, ie. softest, hand

What is claimed is:

1. A polysiloxane composition prepared by reacting a linear organopolysiloxane whose chain ends are formed by $R^3SiO$— units and which has on average two or more —Si(R)(H)—O— units in the chain with a compound of the formula (I)

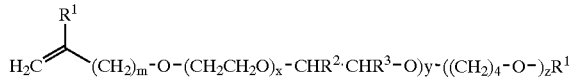

(I)

where the individual —$CH_2CH_2O$—, —$CHR^2$—$CHR^3$—O— and $(CH_2)_4$—O units may be distributed in the chain of the compound of the formula (I) in any desired pattern, this reaction being carried out in such a way that the resultant product still contains Si—H bonds and the resultant product is admixed with water and a protic acid or is admixed with a base, the base being an amino-functional organopolysiloxane or a mixture of an alcohol of 5 to 50 carbon atoms and an alkali metal alkoxide or a mixture of water and a strong inorganic base, wherein every R is independently phenyl or alkyl of 1 to 4 carbon atoms, $R^1$ is H or R, one of $R^2$ and $R^3$ is H and the other is $CH_3$ and wherein m is from 1 to 8, x is from 2 to 40, y is from 0 to 10, and z is from 0 to 10.

2. A composition according to claim 1, wherein the chain of the organopolysiloxane used for the reaction additionally contains units of the formula —$Si(R^2)$—O—.

3. A composition according to claim 1, wherein the chain of the organopolysiloxane used for the reaction additionally contains units of the formula —$Si(R)(R^4)$—O—, and $R^4$ is linear or branched alkyl of 5 to 25 carbon atoms.

4. A composition according to claim 1, wherein every R is $CH_3$.

5. A composition according to claim 1, wherein, after the reaction of the organopolysiloxane with a compound of the formula (I), water and a strong inorganic base are added in such an amount that the resultant mixture has a pH in the range from 7.5 to 10.5.

6. A composition according to claim 1, wherein the addition of base or of water and acid is followed by the addition of water and optionally also a dispersant or dispersant mixture in such an amount that an aqueous polysiloxane dispersion is formed.

7. A composition according to claim 1, wherein the strong inorganic base used is sodium hydroxide or potassium hydroxide.

8. A composition according to claim 1, wherein 20 to 100% of the silicon atoms in the organopolysiloxane used for the reaction, except for the two silicon atoms at the chain ends, each have a hydrogen atom attached to them.

9. A composition according to claim 1, wherein the organopolysiloxane used for the reaction contains 10 to 500 silicon atoms.

10. A composition according to claim 1, wherein the organopolysiloxane used is reacted with a compound of the formula (II)

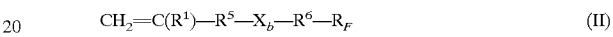

(II)

before or simultaneously with the reaction with the compound of the formula (I), or, after the reaction of the organopolysiloxane with the compound of formula (I), the resultant product is reacted with a compound of formula (II) prior to addition of water and acid or base, this reaction with a compound of formula (II) being carried out in such a way that the resultant product still contains Si—H bonds, where $R_F$ is a linear or branched perfluoroalkyl radical of 2 to 20 carbon atoms, X is —O—, —S—, —S—S—, —$NR^1$—$SO_2$—, —$NR^1$—, —NH—CO—O—, —NH—CO—NH—, O—CO— or —CO—O—, $R^6$ is $CH_{2a}$, where a is from 0 to 10, $R^5$ is $R^6$ or an $R^6$ radical where a is from 1 to 10 and in which a hydrogen atom is replaced by —$X_b$—$R^6$—$R_F$ or by —COOH, b is 0 or 1, and $R^1$ is as defined in claim 1.

11. A composition according to claim 1, wherein the reaction is carried out with such amounts of organopolysiloxane that a total of 0.7 to 1.0 C=C double bonds are used per Si—H bond in the organopolysiloxane.

12. A composition according to claim 1, wherein the product obtained after the addition of base or of water and acid is reacted with an aminodialkoxyalkylsilane or with a mixture which includes an aminodialkoxyalkylsilane either a linear α,ω-dihydroxypolyorgano-siloxane or a cyclic oligodialkylsiloxane.

13. A method of treating fiber materials, which comprises applying a composition according to claim 1 thereto.

14. A method according to claim 13, wherein the fiber materials are textile fabrics in the form of wovens, knits or nonwovens.

15. A composition according to claim 10, wherein the reaction is carried out with such amounts of organopolysiloxane that a total of 0.7 to 1.0 C=C double bonds in the compound of the formula (I) and of the formula (II) are used per Si—H bond in the organopolysiloxane.

* * * * *